(12) United States Patent
Heo

(10) Patent No.: US 11,915,292 B2
(45) Date of Patent: Feb. 27, 2024

(54) APPARATUS, SYSTEM AND METHOD FOR PROVIDING CUSTOMIZED CLOTHING RECOMMENDATION SERVICE

(71) Applicant: NHN CLOUD CORPORATION, Gyeonggi-do (KR)

(72) Inventor: Ohk Yeob Heo, Gyeonggi-do (KR)

(73) Assignee: NHN CLOUD CORPORATION, Seongnam-si (KR)

(*) Notice: Subject to any disclaimer, the term of this patent is extended or adjusted under 35 U.S.C. 154(b) by 640 days.

(21) Appl. No.: 16/953,320

(22) Filed: Nov. 19, 2020

(65) Prior Publication Data
US 2021/0150612 A1 May 20, 2021

(30) Foreign Application Priority Data
Nov. 20, 2019 (KR) .................. 10-2019-0149528

(51) Int. Cl.
*G06Q 30/0601* (2023.01)
*G06F 16/583* (2019.01)
(Continued)

(52) U.S. Cl.
CPC ..... *G06Q 30/0629* (2013.01); *G06F 16/5854* (2019.01); *G06F 16/9535* (2019.01);
(Continued)

(58) Field of Classification Search
CPC . G06T 17/20; G06T 7/60; G06T 11/00; G06T 17/00; G06Q 30/0601; A41H 3/007; G06B 19/41865; G06B 2219/45222
See application file for complete search history.

(56) References Cited

U.S. PATENT DOCUMENTS 6,546,309 B1 * 4/2003 Gazzuolo ............... G06T 17/20
702/167
7,239,151 B2 * 7/2007 Bailey .................... G01N 22/00
324/644
(Continued)

FOREIGN PATENT DOCUMENTS

KR 2002-0077623 10/2002
KR 10-2003-0083453 10/2003
(Continued)

OTHER PUBLICATIONS

Office Action dated Feb. 9, 2021 for Korean Patent Application No. 10-2019-0149528 and its English Translation from Global Dossier.
(Continued)

*Primary Examiner* — Yosef Kassa
(74) *Attorney, Agent, or Firm* — Ladas & Parry, LLP

(57) ABSTRACT

An apparatus, a system, and a method for providing a customized clothing recommendation service are provided. The method for providing a customized clothing recommendation service recommending clothing products with a neckline suitable for a user by a neckline recommendation service providing server, comprises: constructing a database for storing clothing product information matching neckline type information to clothing products; receiving an image of a user's upper body; detecting a face from the received upper body image and determining a face type of the detected face; and determining neckline type information matching the determined face type and detecting one or more clothing products matching the determined neckline type information; and providing the detected clothing products to the user.

18 Claims, 13 Drawing Sheets

(51) Int. Cl.
  *G06F 16/9535* (2019.01)
  *G06T 7/60* (2017.01)
  *G06V 10/764* (2022.01)
  *G06V 40/16* (2022.01)
  *G06F 18/22* (2023.01)

(52) U.S. Cl.
  CPC ..... *G06Q 30/0621* (2013.01); *G06Q 30/0631* (2013.01); *G06Q 30/0643* (2013.01); *G06T 7/60* (2013.01); *G06V 10/764* (2022.01); *G06V 40/16* (2022.01); *G06F 18/22* (2023.01); *G06T 2207/30201* (2013.01); *G06V 40/165* (2022.01); *G06V 40/169* (2022.01)

(56) References Cited

U.S. PATENT DOCUMENTS

| | | | | |
|---|---|---|---|---|
| 7,479,956 | B2* | 1/2009 | Shaw-Weeks | G06T 17/00 348/51 |
| 7,561,726 | B2* | 7/2009 | Lu | G06V 20/64 382/128 |
| 7,584,122 | B2* | 9/2009 | Kozinn | G06Q 40/04 705/37 |
| 10,366,125 | B2* | 7/2019 | Shinkuma | G06Q 50/01 |
| 2018/0365850 | A1* | 12/2018 | Xu | G06Q 30/0621 |
| 2019/0287150 | A1* | 9/2019 | Anger | G06F 16/2428 |

FOREIGN PATENT DOCUMENTS

| | | |
|---|---|---|
| KR | 10-2010-0093232 | 8/2010 |
| KR | 10-2013-0027801 | 3/2013 |
| KR | 10-2016-0070498 | 6/2016 |

OTHER PUBLICATIONS

Notice of Allowance dated Aug. 30, 2021 for Korean Patent Application No. 10-2019-0149528 and its English Translation from Global Dossier.

* cited by examiner

APPARATUS, SYSTEM AND METHOD FOR PROVIDING CUSTOMIZED CLOTHING RECOMMENDATION SERVICE

CROSS REFERENCE TO RELATED APPLICATION

This application claims priority from and benefits of Korean Patent Application No. 10-2019-0149528, filed on Nov. 20, 2019, which are hereby incorporated by reference for all purposes as if fully set forth herein.

BACKGROUND OF THE DISCLOSURE

Technical Field

The present disclosure generally relates to an apparatus, a system, and a method for providing a customized clothing recommendation service. More specifically, some exemplary embodiments of the present disclosure relate to an apparatus, a system, and a method for providing a customized clothing recommendation service that recommends clothing products having a neckline suitable for a user's face type.

Related Art

Recently, with a growing interest in fashion, information about clothing is being spread actively online. Individual needs are getting more complex, clothing market that helps express one's own personality is improving, and the trend that people try to solve their needs through purchase on the Internet has become the mainstream, which, at the same time, reveals a limit in purchasing clothes that help express customers' personality and are optimized for the customers because of the current situation where people have to purchase ready-made clothes online.

Now, a technology for finding customized clothes suitable for a user by using a mobile communication terminal is being developed. Also, various online services have been developed, ranging from a function that simply provides a user with customized clothing information recommended together with additional information such as a weather condition to a service through which the user may coordinate clothes in a desired style by using clothing data prepared in advance after connecting to a special Internet server and may purchase desired clothes.

For example, a system and a method have been proposed, from which a user may obtain an advice about which clothes to choose for a specific event or for specific weather in real-time after connecting to a specific Internet site by using a mobile communication terminal based on the conventional technology.

Most of the conventional clothing coordination methods described above either provide a user with coordination information online after the user connects to a web server or a communication server providing information through the Internet or a communication network or help the user purchase clothes suitable for the user by using image synthesis and editing techniques available only on websites.

REFERENCES

Patents (Patent 1) Korean Patent Application No. 10-2001-0017399

SUMMARY OF THE DISCLOSURE

An object of the present disclosure ma be to provide an apparatus, a system, and a method for providing a customized clothing recommendation service, which recommend clothing products having a neckline suitable for a user's face type.

Additionally, an object of the present disclosure may be to provide an apparatus, a system, and a method for providing a customized clothing recommendation service, which recommend clothing products of which detailed attributes such as width and depth of a neckline and a collar arranged along the neckline are suitable for a user's face type.

Further, an object of the present disclosure may be to provide an apparatus, a system, and a method for providing a customized clothing recommendation service, which recommend clothing products capable of supplementing a user's complex about the face.

In accordance with some embodiments of the disclosed subject matter, in a method for providing a customized clothing recommendation service recommending clothing products with a neckline suitable for a user by a neckline recommendation service providing server, the method comprising: constructing a database for storing clothing product information matching neckline type information to clothing products; receiving an image of the user's upper body; detecting a face from the received upper body image and determining a face type of the detected face; and determining neckline type information matching the determined face type and detecting clothing products matching the determined neckline type information; and providing the detected clothing products to the user.

In accordance with some embodiments of the disclosed subject matter, a method for providing a customized clothing recommendation service recommending clothing products with a neckline suitable for a user by a neckline recommendation service providing server, the method comprising: receiving clothing product information including neckline type information; receiving an image of an upper body including a face; receiving selected face type information according to selection of a face type from the user; detecting a face from the received image of the upper body and determining a face type of the detected face; and recommending neckline clothing products based on the determined face type and the selected face information.

In accordance with some embodiments of the disclosed subject matter, a system providing a customized clothing recommendation service recommending clothing products with a neckline suitable for a user by a processor of a neckline recommendation service providing server, the system comprising: at least one processor; and at least one or more memories, wherein at least one program is stored in the memory and is executed by the at least one or more processors, the at least one program: constructing a database for storing clothing product information matching neckline type information to clothing products; receiving an image of the user's upper body; detecting a face from the received upper body image and determining a face type of the detected face; and determining neckline type information matching the determined face type and detecting clothing products matching the determined neckline type information; and providing the detected clothing products to the user.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

DESCRIPTION OF EXEMPLARY EMBODIMENTS

Since the present disclosure may be modified in various ways and may provide various embodiments, specific embodiments will be depicted in the appended drawings and described in detail with reference to the drawings. The effects and characteristics of the present disclosure and a method for achieving them will be clearly understood by referring to the embodiments described later in detail together with the appended drawings. However, it should be noted that the present disclosure is not limited to the embodiment disclosed below but may be implemented in various forms. In the following embodiments, terms such as first and second are introduced to distinguish one element from the others, and thus the technical scope of the present disclosure should not be limited by those terms. Also, a singular expression should be understood to indicate a plural expression unless otherwise explicitly stated. The term include or have is used to indicate existence of an embodied feature or constituting element in the present disclosure and should not be understood to preclude the possibility of adding one or more other features or constituting elements. Also, constituting elements in the figure may be exaggerated or shrunk for the convenience of descriptions. For example, since the size and thickness of each element in the figure has been arbitrarily modified for the convenience of descriptions, it should be noted that the present disclosure is not necessarily limited to what has been shown in the figure.

In what follows, embodiments of the present disclosure will be described in detail with reference to appended drawings. Meanwhile, when descriptions are given with reference to the appended drawings, the same or corresponding constituting element is assigned the same reference number, and repeated descriptions thereof will be omitted.

System flow: The disclosed technology is related to providing a method for providing a customized clothing recommendation service.

Computer system: A simplified summary is provided to help basic or general understanding of various aspects of illustrative and non-limiting implementations subsequent to more detailed descriptions and appended drawings. However, this summary should not be considered to be comprehensive or a comprehensive overview. Instead, the sole purpose of this summary is to point out part of concepts related to part of illustrative and non-limiting implementations in a simplified form as a prelude to more detailed descriptions of various implementations that follow.

Other aspects and advantages of the disclosed technology may be understood by examining drawings, detailed descriptions, and appended claims.

Figure 1:
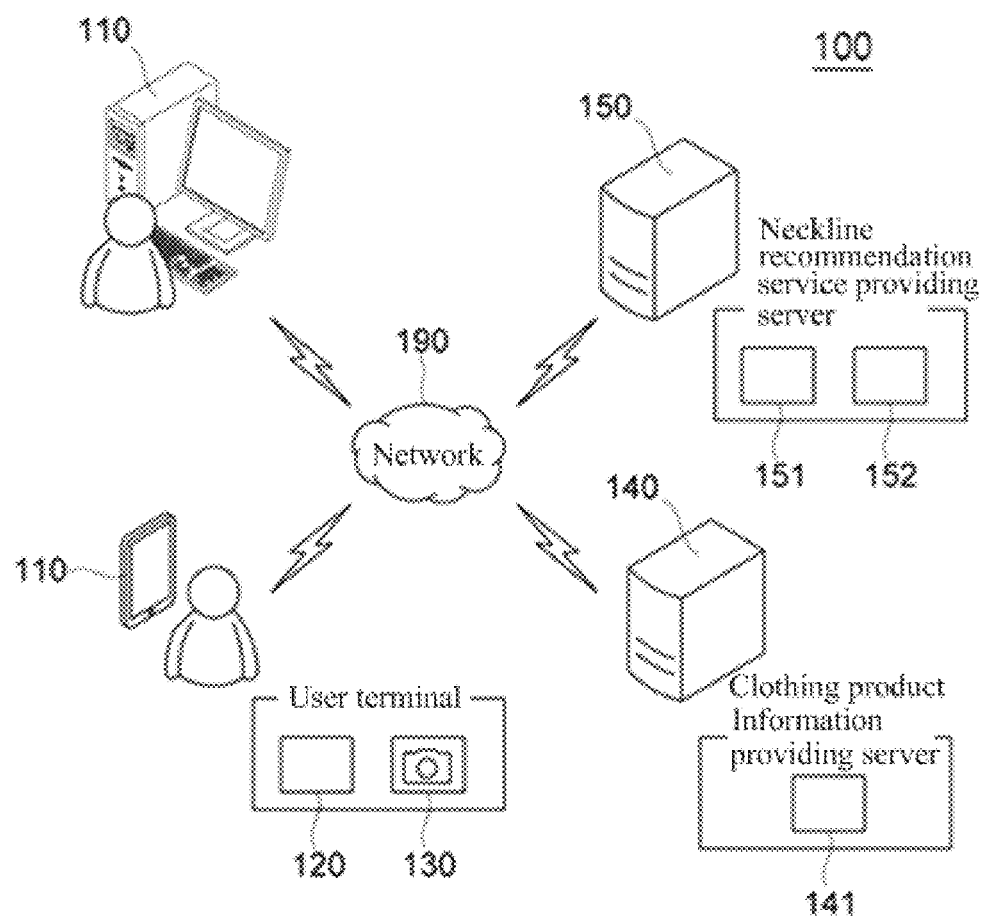
FIG. 1 illustrates one example of an environment for a system providing a customized clothing recommendation service according to an embodiment of the present disclosure.
Figure 2:
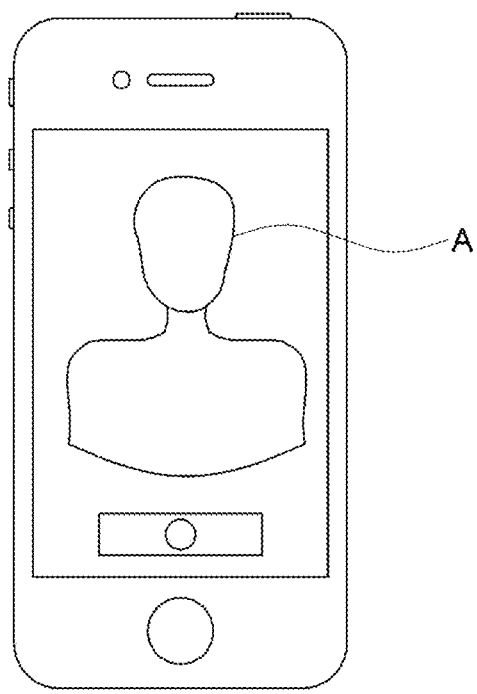
FIG. 2 illustrates a method for capturing an image of a user's upper body by using a user's terminal to collect information on the user's face according to an embodiment of the present disclosure.
Figure 3:
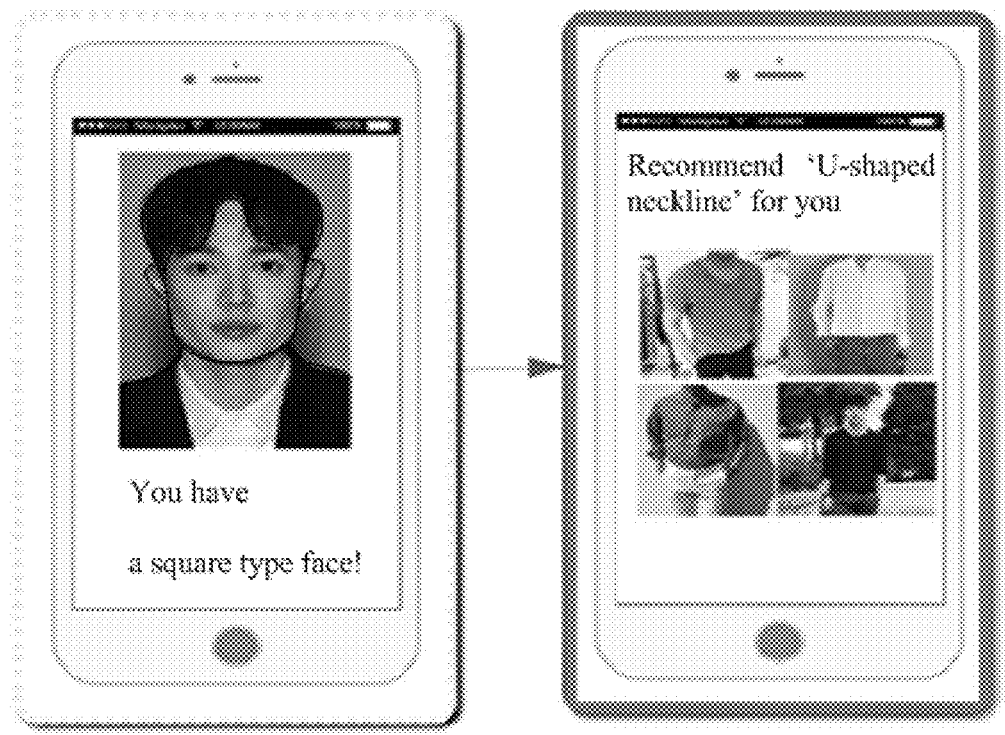
FIG. 3 illustrates an example of information about a determined face type of a user and an example of information about a clothing product with a recommended neckline according to an embodiment of the present disclosure.
Figure 4:
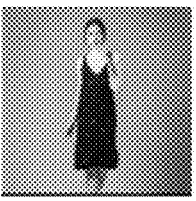
FIG. 4 illustrates an example of clothing product information provided by a server providing the clothing product information to describe a method for collecting the clothing product information according to a neckline type according to an embodiment of the present disclosure.
Figure 5:
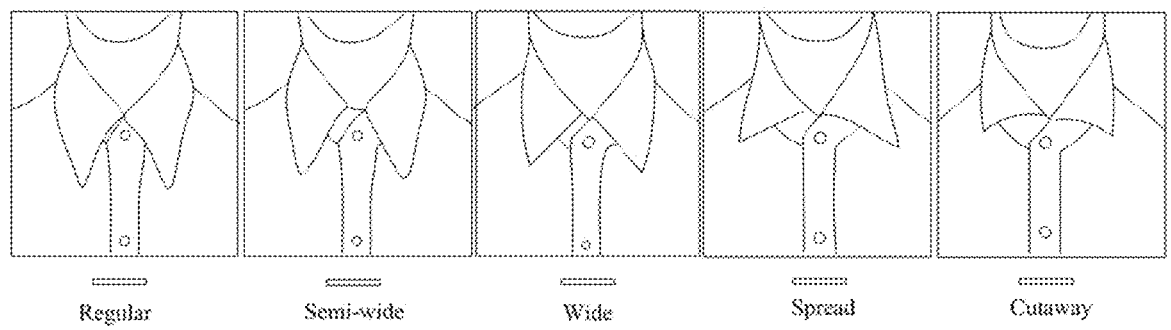
FIG. 5 illustrates an example of collar information among detailed attributes of a clothing product provided by a server providing clothing product information to describe a method for collecting the clothing product information according to a neckline type according to an embodiment of the present disclosure.
Figure 6:
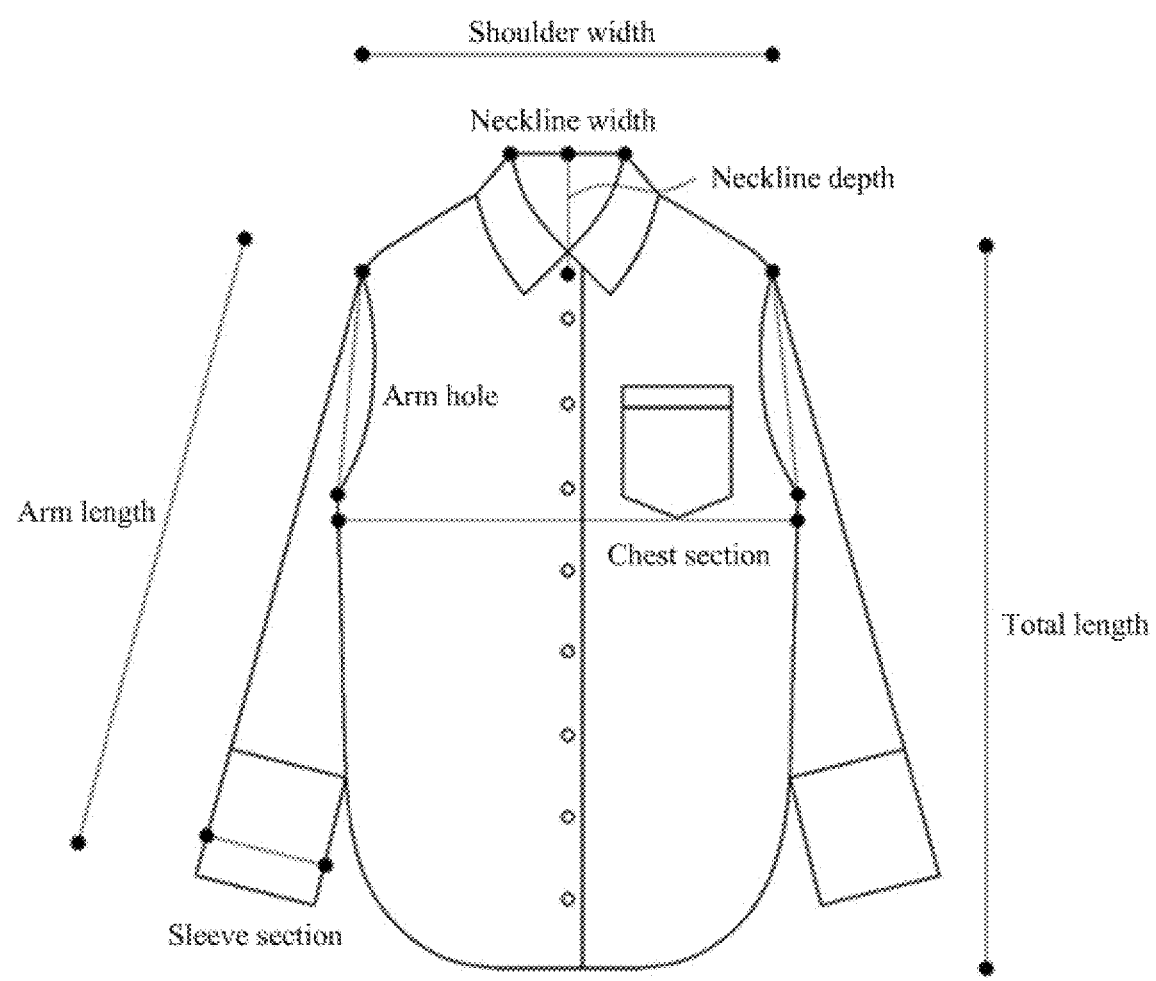
FIG. 6 illustrates an example information about neckline width and depth among detailed attributes of a clothing product provided by a server providing clothing product information to describe a method for collecting the clothing product information according to a neckline type according to an embodiment of the present disclosure.
Figure 7:
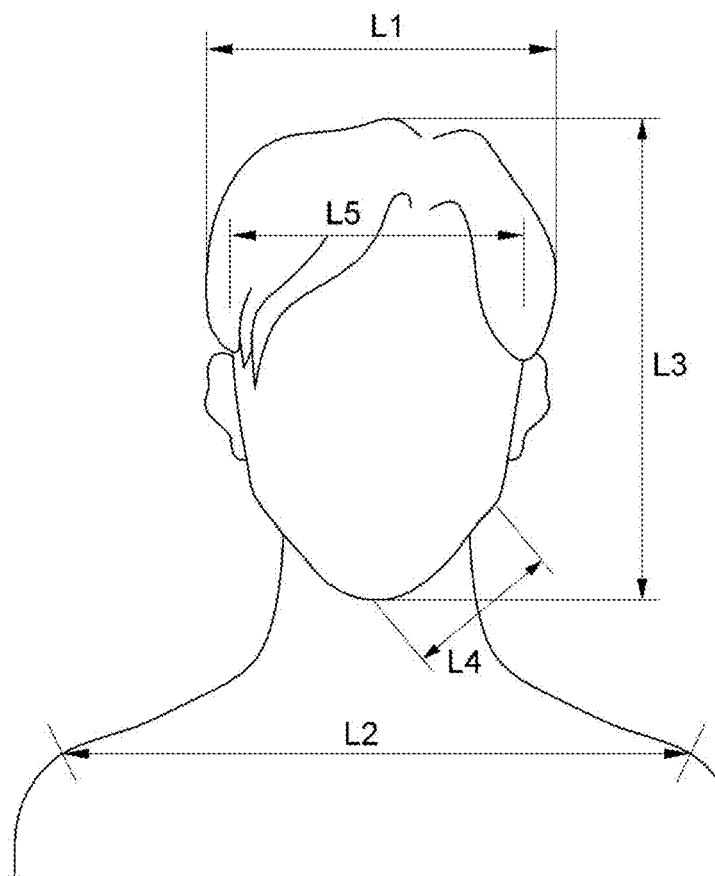
FIG. 7 illustrates an example of a method for collecting metric information required to determine a user's face type from a captured image of the user's upper body according to an embodiment of the present disclosure.

FIG. 1 illustrates one example of an environment for a system providing a customized clothing recommendation service according to an embodiment of the present disclosure; FIG. 2 illustrates a method for capturing an image of a user's upper body by using a user's terminal to collect information on the user's face according to an embodiment of the present disclosure; FIG. 3 illustrates an example of information about a determined face type of a user and an example of information about a clothing product with a recommended neckline according to an embodiment of the present disclosure; FIG. 4 illustrates an example of clothing product information provided by a server providing the clothing product information to describe a method for collecting the clothing product information according to a neckline type according to an embodiment of the present disclosure; FIG. 5 illustrates an example of collar information among detailed attributes of a clothing product provided by a server providing clothing product information to describe a method for collecting the clothing product information according to a neckline type according to an embodiment of the present disclosure; FIG. 6 illustrates an example of information about neckline width and depth among detailed attributes of a clothing product provided by a server providing clothing product information to describe a method for collecting the clothing product information according to a neckline type according to an embodiment of the present disclosure; and FIG. 7 illustrates an example of a method for collecting metric information required to determine a user's face type from a captured image of the user's upper body according to an embodiment of the present disclosure.

Referring to FIG. 1, a system 100 for providing a customized clothing recommendation service may include a user terminal 110, a clothing product information providing server 140, a neckline recommendation service providing server 150, and a network 190.

More specifically, the user terminal 110 may include an application 120 and a camera 130. The camera 130 may be used to capture an image of a user's face and upper body including shoulders. The user terminal 100 may be a part of a standalone camera, other device such as an Internet-access computing device equipped with a camera such as a smartphone, and any device having a function of capturing images or wirelessly connected or operated with the camera 130. For instance, examples of the user terminal 100 may include iPhone® from Apple Computer and Android-based phones from Samsung and LG. The application 120 may be configured to provide an user interface for suggesting an image capture guideline to a user when the user captures an image of the user's upper body through the camera 130 and generate an upper body image for determining the user's face type. The upper body image may include, for example, but not limited to, the user's face and shoulders. As one example, referring to FIG. 2, the application 120 may provide an interface for displaying an upper reference line A including a user's face and both ends of the shoulders on the display of the user terminal 100. The user may capture an image of the user through the camera 130 so that the user's upper body fits the upper reference line A. To determine the user's face type, an image of the user's upper body has to be taken. In other words, an image has to be captured so that the user's whole face and both ends of the user's shoulders are contained therein. The user terminal 100 may transmit the generated image of the user's upper body to the neckline recommendation service providing server 150 through the network 190 to obtain information about a determined face type of the user and a clothing product with a recommended neckline. The user terminal 110 may receive information about the user's face type and the clothing product with the recommended neckline from the neckline recommendation service providing server 150 and provide the received information to the user. As one example, referring to FIG. 3, the received information indicates that the user's face is a square face, and the user terminal 110 discloses information of recommending one or more clothing products with a U-shaped neckline, which is suitable for the square-shaped face.

The clothing product information providing server 140 may collect clothing product information and store the collected information in the neckline recommendation service providing server 150. Also, the clothing product information providing server 140 may provide the clothing product information to the neckline recommendation service providing server 150. More specifically, the clothing product information providing server 140 may include a clothing information storage 141. The clothing information storage 141 may store the clothing product information. The clothing product information may include information about necklines and information about detailed attributes. As one example, referring to FIG. 4, it may be known that a predetermined one-piece dress product has a V-shaped neckline from the attribute field among clothing product information. As described above, for most cases, information about the neckline may be included in the attribute information of a clothing product. If information about the product attributes is not entered properly, companies providing clothing products may receive a penalty from a clothing product providing service manager and thus, the companies providing clothing products tend to enter the very details of the product attribute information. The predetermined clothing product located below the one-piece dress of FIG. 4 is a bad example in which information about the product attributes have not been entered properly. As another example, referring to FIG. 5, a clothing product having a predetermined collar may have a detailed attribute field containing information about a collar shape. As yet another example, referring to FIG. 6, for a predetermined clothing product, information about width and depth of a neckline of a clothing product may be entered to the detailed attribute field.

The neckline recommendation service providing server 150 may be configured to receive an image including the user's upper body from the user terminal 110 and determine the user's face type. Also, the neckline recommendation service providing server 150 may be configured to recommend one or more clothing products with a recommended neckline suitable for the user by using the determined face type information and clothing product information provided by the clothing product information providing server 140. Also, the neckline recommendation service providing server 150 may provide information about the determined face type of the user and information about clothing products with a recommended neckline to the user terminal 110. However, the present disclosure is not limited to the specific operation, where the neckline recommendation service providing server 150 may be built so as to be embedded in the user terminal 110. More specifically, the neckline recommendation service providing server 150 may include a clothing information storage 151 and a clothing product recommendation engine 152. The clothing information storage 151 may store one or more face images provided by the user terminal 110 and clothing product information provided by the clothing product information providing server 140. The clothing product recommendation engine 152 may recommend clothing products with a recommended neckline suitable for the user based on the face images and the clothing product information stored in the clothing information storage 151. In other words, the clothing product recommendation engine 152 may recommend clothing products having a neckline matching the user's face type.

Also, the clothing product recommendation engine 152 may be configured to measure predetermined metric values from the face image. As one example, referring to FIG. 7, the clothing product recommendation engine 152 may measure a first value (L1) corresponding to a head width, a second value (L2) corresponding to a shoulder width, a third value (L3) corresponding to a vertical head length, a fourth value (L4) for determining the length of a jawline, and a fifth value (L5) corresponding to the length of a forehead from the image of the user's upper body. For example, the head width may be a lateral distance between both sides of the head. The vertical head length may be the vertical distance from the top of the head to the end of the chin. The total length of the jawline may be obtained by multiplying the distance from the part at about 2.5 cm below the ear, that is, the widest part of the chin to the middle part of the chin (the part that descends straight along the philtrum) by 2. The length of the forehead may be measured by the length from one end to the other end of the widest lateral points of the forehead. The shoulder width may be a horizontal length from the left shoulder tip to the right shoulder tip.

Also, the clothing product recommendation engine 152 may determine whether the size of the user's face is large using a reference face size provided by the Korea Statistics Office's Korean body size survey and the value measured from the user's face image. According to the Korean body size survey (2016), the standard face size of Korean men is 15.9 cm in head width, 23.9 cm in vertical head length, and 39.6 cm in shoulder width. The standard face size of Korean women is 15.1 cm in head width, 22.1 cm in vertical head length, and 35.8 cm in shoulder width. The standard face size may be used as a reference face size. As one example, the clothing product recommendation engine 152 may determine a face as being large if the first value (L1) is larger than 50% of the second value (L2). As another example, the clothing product recommendation engine 152 may determine a face as being large if the first value (L1) is 20% or more larger than the standard head width, the third value (L3) is 20% or more larger than the standard vertical head length, and the first value (L1) is larger than 50% or more of the second value (L2).

Also, the clothing product recommendation engine 152 may determine the user's face type by using a predetermined metric value measured from the face image of the user. As one example, the clothing product recommendation engine 152 may classify the face type into, for example, but not limited to, oblong, round, square, oval, and triangle types. If the third value (L3), which is the vertical head length, is more than 1.8 times the first value (L1), which is the head width, the first value (L1), which is the head width, 2 times the fourth value (L4), which is the length of the jawline, and the fifth value (L5), which is the length of the forehead, are the same within 20% of each other, the clothing product recommendation engine 152 may determine a face as an oblong type. If a difference between the third value (L3), which is the vertical head length, and the first value (L1), which is the head width, is within 2.5 cm, and the fifth value (L5), which is the length of the forehead, is 60% to 70% of the first value (L1), which is the head width, the clothing product recommendation engine 152 may determine the face as the round type. In addition, the clothing product recommendation engine 152 may be configured to determine a face as the round type if the jawline is round and smooth. If a difference between the third value (L3), which is the vertical head length, and the first value (L1), which is the head width, is within 2.5 cm to 5 cm, and the first value (L1), which is the head width, 2 times the fourth value (L4), which is the length of the jawline, and the fifth value (L5), which is the length of the forehead are the same within 20% of each other, the clothing product recommendation engine 152 may determine a face as a square type. In addition, the clothing product recommendation engine 152 may be configured to determine a face as the square type if each side of the face follows a straight line, and the portion of the face extending from the part below the ear to the center of the chin forms a sharply angled line. If the face size is the same or similar as or with the standard face size of Koreans within 20% of error, and the fifth value (L5), which is the length of the forehead is larger than 2 times the fourth value (L4), which is the length of the jawline, the clothing product recommendation engine 152 may determine a face as an oval type. In addition, the clothing product recommendation engine 152 may be configured to determine a face as an oval type if the jawline is round. If the third value (L3), which is the vertical head length, is 1.6 or 1.8 times the first value (L1), which is the head width, and the fifth value (L5), which is the length of the forehead is larger than 2 times the fourth value (L4), which is the length of the jawline, the clothing product recommendation engine 152 may determine a face as a triangle type. In addition, the clothing product recommendation engine 152 may be configured to determine a face as a triangle type if the length of the jawline is short and protruding.

The clothing product recommendation engine 152 may be configured to recommend one or more clothing product with a neckline matching the face type determined based on the user's image. As one example, the clothing product recommendation engine 152 may recommend one or more clothing products with a round-type neckline or an off-shoulder type neckline in response to the determination result that the user has an oblong type face. In the case of a round type face, the clothing product recommendation engine 152 may recommend one or more clothing products with a V-shaped neckline, a square-type neckline, or a boat-type neckline. In the case of a square type face, the clothing product recommendation engine 152 may recommend one or more clothing products with a round type neckline, a U-shaped neckline, or a sweetheart type neckline. In the case of an oval type face, the clothing product recommendation engine 152 may recommend one or more clothing products with all types of necklines. In the case of a triangle type face, the clothing product recommendation engine 152 may recommend one or more clothing products with a round type neckline, a U-shaped neckline, a high type neckline, or a boat type neckline. For example, a user with a round type face may get a recommendation of clothing products with a square type, a boat type, or a V-shaped neckline which may make the user's face look slim from the clothing product recommendation engine 152. For users with an oblong type face, clothing products with a V-shaped neckline, which make the user's face look longer, may not be recommended, but clothing products with a round type neckline or an off-shoulder type neckline, which draw eyes from side to side, may be recommended instead. For users with a square type face, clothing products with a square type neckline, which make the user's face look sharp, may not be recommended, but clothing products with a U-shaped neckline, which give a friendly look, may be recommended.

Also, the clothing product recommendation engine 152 may be configured to recommend clothing products with a collar matching the face type of a user. For example, referring to FIG. 5, the clothing product recommendation engine 152 may recommend one or more clothing products with a vertically long collar for users with a round type face. Also, the clothing product recommendation engine 152 may recommend one or more clothing products with a vertically short collar for an oblong type face. Also, for users with a large face, the clothing product recommendation engine 152 may recommend one or more clothing products with a collar of which size is enlarged from the standard collar size in proportion as the face size is increased.

Also, the clothing product recommendation engine 152 may recommend clothing products with a neckline of which width and depth are proportional to the face size. For instance, the standard width and depth of the neckline may be 16 to 18 cm, which is the neckline width according to the average face size of Koreans, and 8 to 9 cm, which is the neckline depth according to the same face size. In other words, the clothing product recommendation engine 152 may recommend clothing products with a neckline having dimensions in proportion to the standard width and depth of the neckline based on the standard face size of Koreans and the user's face size according to the user's face size determined. For example, the clothing product recommendation engine 152 may recommend a V-shaped neckline for a round type and large-sized face, where, in this case, clothing products with a neckline whose width and depth are extended by 10% from the standard neckline width and depth; also, a square type or a boat type neckline may be recommended, where, in this case, clothing products with a neckline whose width is extended by 10% from the standard neckline width. Also, when the user has a round type and large-size face, and a clothing product with a collar is recommended, the clothing product recommendation engine 152 may recommend clothing products having a vertically long collar whose size is extended by 10% from the standard collar size. Also, for a square type and large-sized face, the clothing product recommendation engine 152 may recommend clothing products with a round type or U-shaped neckline whose width is extended by 10% from the standard neckline width. Also, when the user has a square type and large-size face, and a clothing product with a collar is recommended, the clothing product recommendation engine 152 may recommend clothing products having a vertically long collar whose size is extended by 10% from the standard collar size.

Therefore, some exemplary embodiments of the present disclosure may recommend clothing products capable of supplementing a user's complex about the face. Also, various exemplary embodiments of the present disclosure may recommend clothing products having a neckline suitable for a user's face type. Also, certain exemplary embodiments of the present disclosure may recommend clothing products of which detailed attributes such as width and depth of a neckline and a collar arranged along the neckline are suitable for a user's face type.

Figure 8:
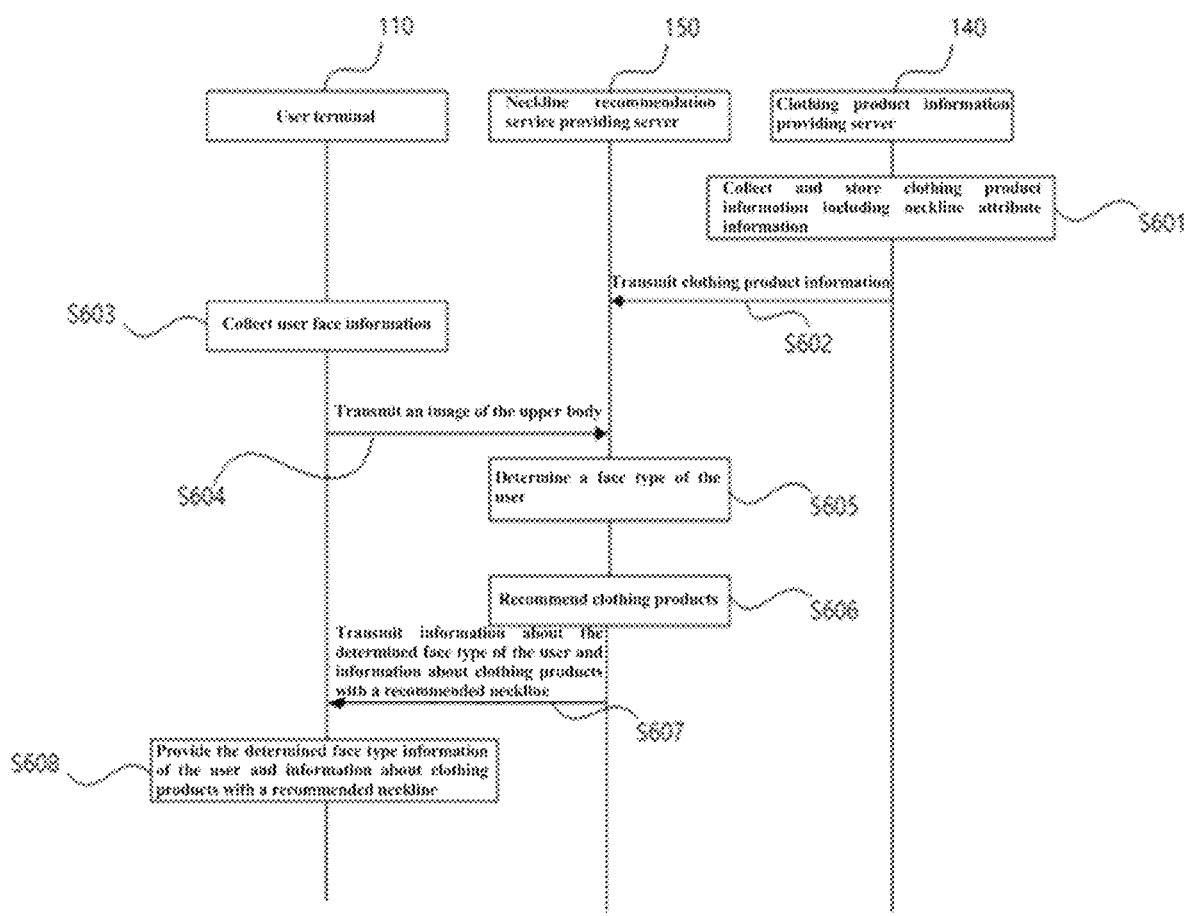
FIG. 8 illustrates a signal flow of a system for providing a customized clothing recommendation service according to a embodiment of the present disclosure.

FIG. 8 illustrates a signal flow of a system for providing a customized clothing recommendation service according to an embodiment of the present disclosure.

Referring to FIG. 8, the clothing product information server 140 may collect and store clothing product information, which is information on clothing products, including neckline attribute information, which is information on a neckline attribute of each of the clothing products (S601). The clothing product information providing server 140 may transmit the clothing product information to the neckline recommendation service providing server 150 (S602). The user terminal 110 may collect user face information which is information on faces (S603). The user terminal 110 may transmit an image including a user's upper body to the neckline recommendation service providing server 150 (S604). The neckline recommendation service providing server 150 may determine the user's face type based on the image of the user's upper body (S605). The neckline recommendation service providing server 150 may recommend one or more clothing products based on the determined face type of the user (S606). For example, each face type has one or more corresponding necklines, and the neckline recommendation service providing server 150 may find one or more clothing products with a neckline corresponding to the determined user's face type. The neckline recommendation service providing server 150 may transmit information about the determined face type of the user and/or information about one or more clothing products with a recommended neckline to the user terminal 110, S607. The user terminal 110 may provide information about the determined face type of the user and information one or more about clothing products with a recommended neckline (S608).

Figure 9:
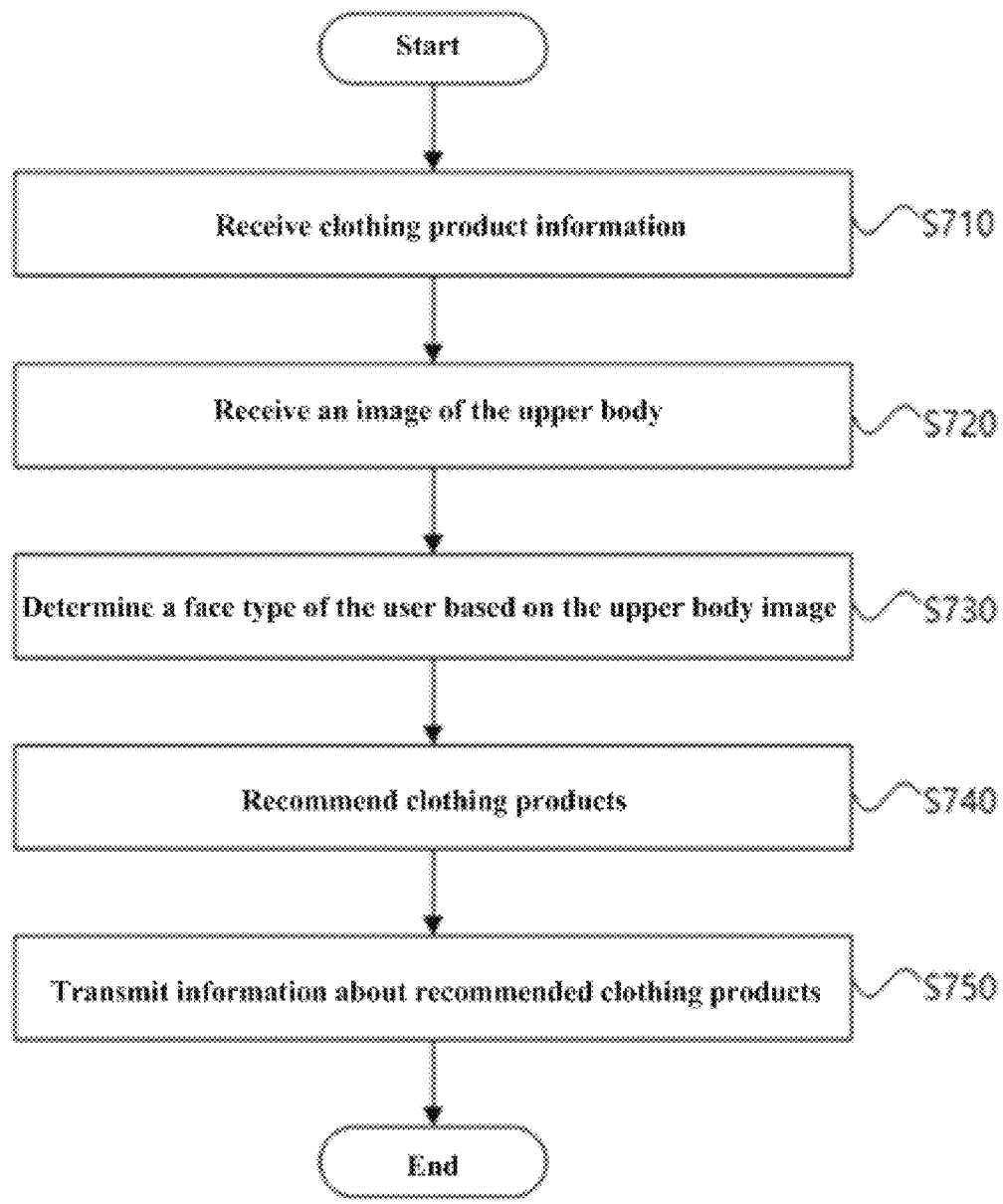
FIG. 9 illustrates a method for providing a customized clothing recommendation service according to a embodiment of the present disclosure.

FIG. 9 illustrates a method for providing a customized clothing recommendation service according to an embodiment of the present disclosure.

Referring to FIG. 9, the method for providing the customized clothing recommendation service according to the embodiment of the present disclosure may include an operation S710 that a neckline recommendation service providing server receives clothing product information.

Also, the method for providing the customized clothing recommendation service according to an embodiment of the present disclosure may include an operation S720 that the neckline recommendation service providing server receives information about a user' face and shoulders. More specifically, the neckline recommendation service providing server may receive an image of the upper body, described in FIG. 2 from a user terminal. The image of the upper body may include at least the user's face and shoulders.

Further, the method for providing the customized clothing recommendation service according to an embodiment of the present disclosure may include an operation S730 that the neckline recommendation service providing server determines a face type of the user based on the image of the upper body of the user, received from the user terminal.

Additionally, the method for providing the customized clothing recommendation service according to an embodiment of the present disclosure may include an operation of S740 that the neckline recommendation service providing server searches and recommends one or more clothing products based on the determined face type of the user.

Also, the method for providing the customized clothing recommendation service according to an embodiment of the present disclosure may include an operation S750 that the neckline recommendation service providing server transmits information about the recommended clothing products to the user terminal.

Figure 10:
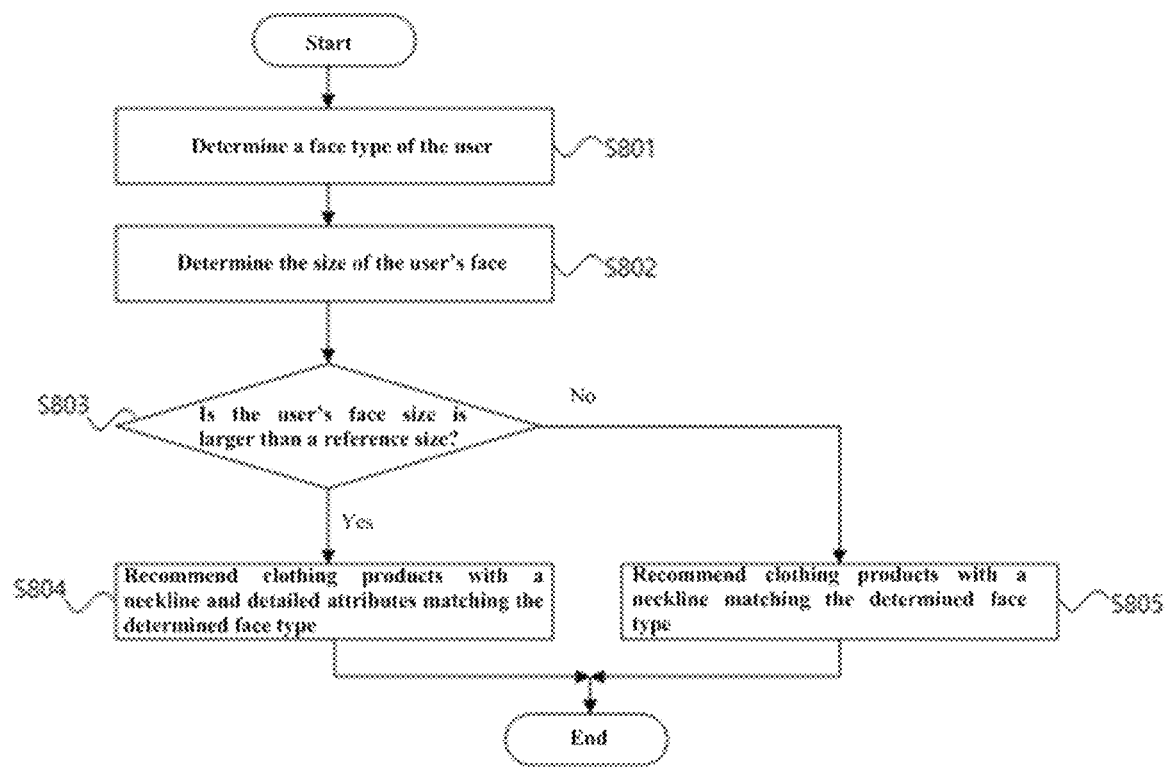
FIG. 10 illustrates a method for determining a face type of a user and recommending a clothing product according to an embodiment of the present disclosure.

FIG. 10 illustrates a method for determining a face type of a user and recommending a clothing product, for example, the operations S730 and S740 of FIG. 9.

Referring to FIG. 10, the method for determining the face type of the user and recommending the clothing product may include an operation S801 that the neckline recommendation service providing server determines the face type of the user. The operation of determining the face type of the user may follow an operation for determining a face size of the user described above.

Also, the method for determining the face type of the user and recommending the clothing product may include operations S802, S803 that the neckline recommendation service providing server determines a face size of the user. The operation of determining the face size of the user may follow an operation for determining whether a user's face is a large-size face described above.

Further, the method for determining the face type of the user and recommending the clothing product may include an operation of S804 that the neckline recommendation service providing server recommends clothing products with a neckline and detailed attributes matching the determined face type if a user's face is larger than a reference or predetermined face size. The operation of recommending the clothing products with the neckline matching the determined face type may follow an operation for recommending clothing products related to neckline type, width and depth of the neckline, and collar type described above.

Additionally, the method for determining the face type of the user and recommending the clothing product may include an operation that the neckline recommendation service providing server recommends clothing products with a neckline matching the face type determined by the neckline recommendation service providing server if the user's face is not larger than the reference or predetermined face size. The operation of recommending clothing products with the neckline matching the determined face type may follow an operation for recommending clothing products related to the neckline type described above.

Figure 11:
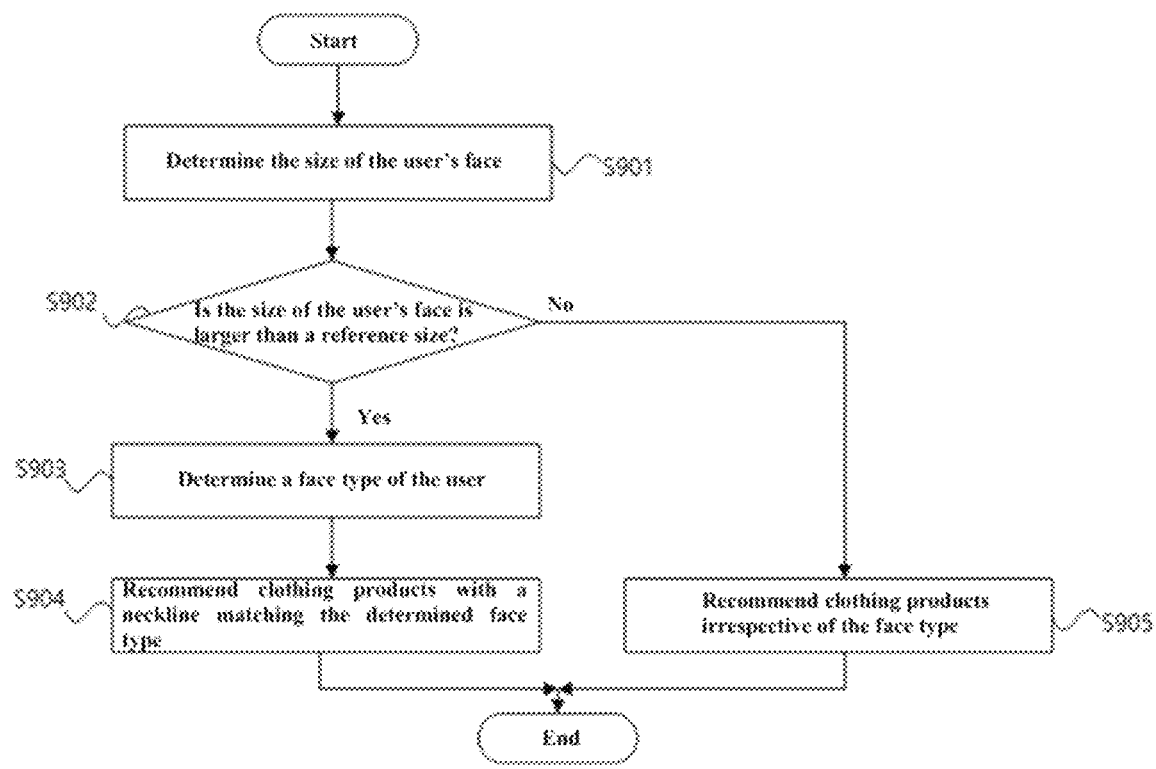
FIG. 11 illustrates a method for determining a face type of a user and recommending a clothing product according to another embodiment of the present disclosure.

FIG. 11 illustrates a method for determining a face type of a user and recommending a clothing product according to another embodiment of the present disclosure.

Referring to FIG. 11, the method for determining the face type of the user and recommending the clothing product may include operations S901, S902 that the neckline recommendation service providing server determines a user's face size. The operation of determining the user's face size may follow an operation for determining whether a user's face is a large-size face.

Also, the method for determining the face type of the user and recommending the clothing product may include an operation S903 that the neckline recommendation service providing server determines a face type of a user if the user's face is larger than a reference or predetermined face size. The operation of determining the face type of the user may follow an operation for determining a face type of a user described above.

Additionally, the method for determining the face type of the user and recommending the clothing product may include an operation S904 that the neckline recommendation service providing server recommends one or more clothing products with a neckline matching the face type of the user determined by the neckline recommendation service providing server. As one example, the operation S904 of recommending the clothing products with the neckline matching the determined face type of may follow an operation for recommending clothing products with a neckline described above. As another example, at the operation S904, the neckline recommendation service providing server may recommend clothing products with a neckline and detailed attributes matching the determined face type. The operation S904 of recommending clothing products with the neckline matching the determined face type may follow an operation of recommending one or more clothing products related to neckline type, width and depth of the neckline, and collar type described above.

Also, the method for determining the face type of the user and recommending the clothing product may include an operation S905 that the neckline recommendation service providing server recommends one or more clothing products regardless of a face type if the user's face is not larger than the reference or predetermined face size. More specifically, in this case, the neckline recommendation service providing server may recommend clothing products with various, arbitrary types of necklines.

Figure 12:
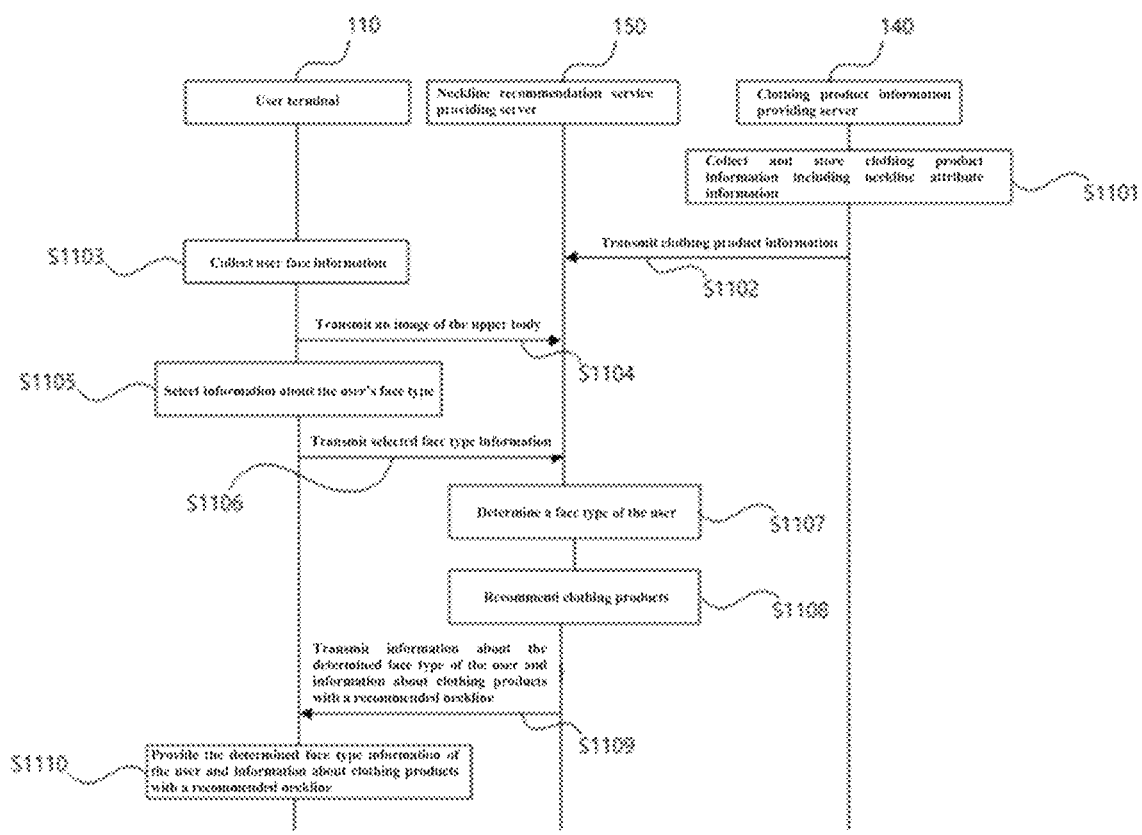
FIG. 12 illustrates a signal flow of a system for providing a customized clothing recommendation service according to another embodiment of the present disclosure.

FIG. 12 illustrates a signal flow of a system for providing a customized clothing recommendation service according to another embodiment of the present disclosure.

Referring to FIG. 12, the clothing product information providing server 140 may be configured to collect and store clothing product information including neckline attribute information (S1101). The clothing product information providing server 140 may be configured to transmit the clothing product information to the neckline recommendation service providing server 150 (S1102). The user terminal 110 may be configured to collect user face information (S1103). The user terminal 110 may be configured to transmit an image including the user's upper body to the neckline recommendation service providing server 150 (S1104). The user terminal 110 may be configured to store user face type information selected by the user (S1105). The user terminal 110 may be configured to transmit the selected face type information to the neckline recommendation service providing server 150 (S1106). The neckline recommendation service providing server 150 may be configured to determine the face type of the user based on the information about the user's face and shoulders (S1107). The neckline recommendation service providing server 150 may be configured to search and recommend one or more clothing products based on the determined face type of the user (S1108). The neckline recommendation service providing server 150 may be configured to transmit information about the determined face type of the user and information about the recommended clothing products with a recommended neckline to the user terminal 110 (S1109). The user terminal 110 may be configured to provide information about the determined face type of the user and information about the clothing products with a recommended neckline (S1110).

Figure 13:
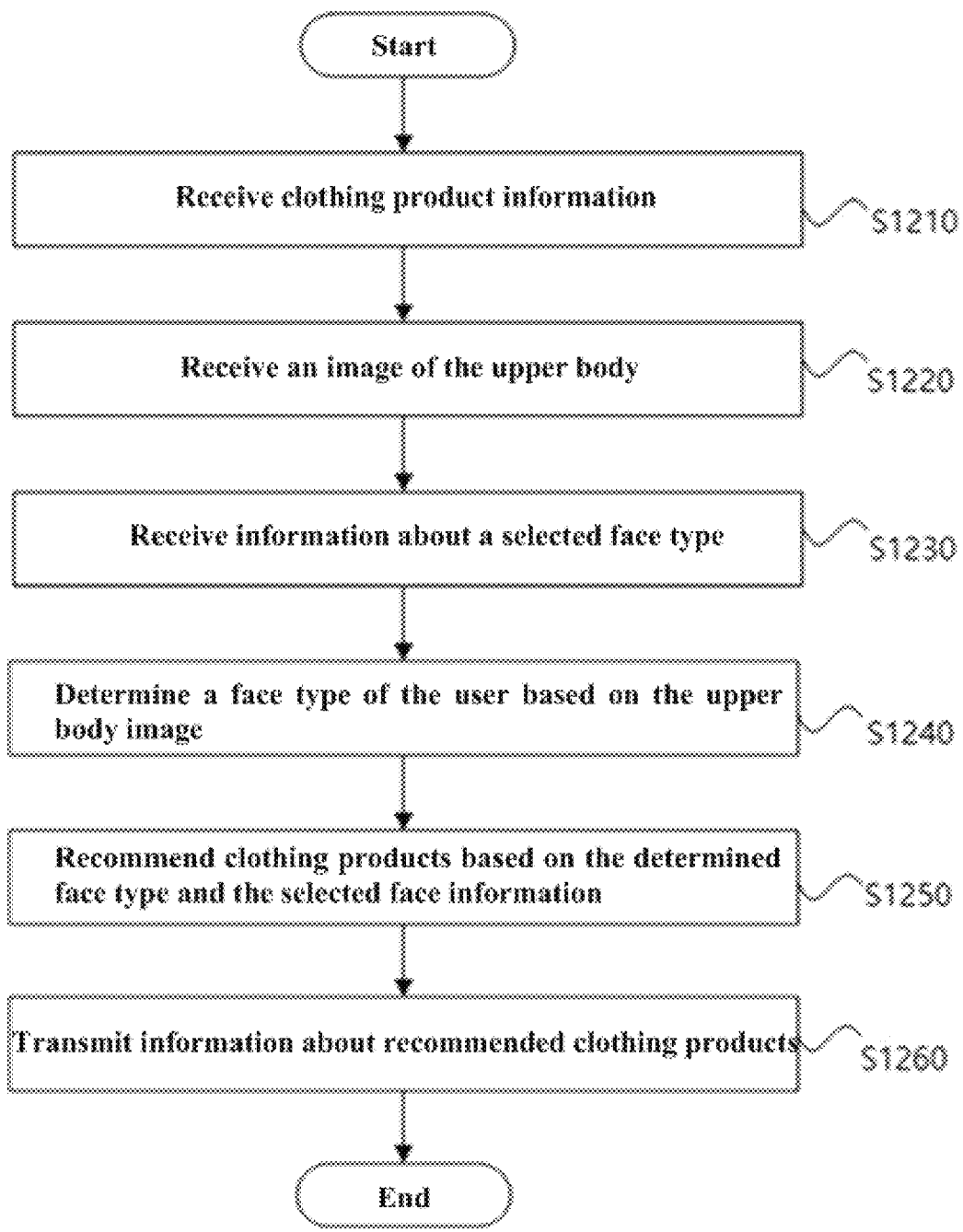
FIG. 13 illustrates a method for providing a customized clothing recommendation service according to another embodiment of the present disclosure.

FIG. 13 illustrates a method for providing a customized clothing recommendation service according to another embodiment of the present disclosure.

Referring to FIG. 13, the method for providing the customized clothing recommendation service according to another embodiment of the present disclosure may include an operation S1210 that the neckline recommendation service providing server receives clothing product information.

Also, the method for providing the customized clothing recommendation service according to another embodiment of the present disclosure may include an operation S1220 that the neckline recommendation service providing server receives an image of an upper body of a user. More specifically, the neckline recommended service providing server may receive a face image described in FIG. 2 from the user terminal. The face image may include information about the user's face and shoulders.

Additionally, the method for providing the customized clothing recommendation service according to another embodiment of the present disclosure may include an operation S1230 that the neckline recommendation service providing server receives information about a selected face type of the user. More specifically, the user may select the face type of the user at an application installed at the user terminal. The user terminal may transmit information about the selected face type of the user according to the selected face type to the neckline recommendation service providing server.

Further, the method for providing the customized clothing recommendation service according to another embodiment of the present disclosure may include an operation S1240 that the neckline recommendation service providing server determines the face type of the user based on the information about the user's face and shoulders.

Also, the method for providing the customized clothing recommendation service according to another embodiment of the present disclosure may include an operation S1250 that the neckline recommendation service providing server searches and recommends one or more clothing products based on the information about the determined face type of the user and information about the selected face type. Detailed descriptions about the steps may follow the method for determining a face type of a user and recommending clothing products of FIG. 14.

Additionally, the method for providing the customized clothing recommendation service according to another embodiment of the present disclosure may include an operation S1260 that the neckline recommendation service providing server transmits information about the recommended clothing products.

Figure 14:
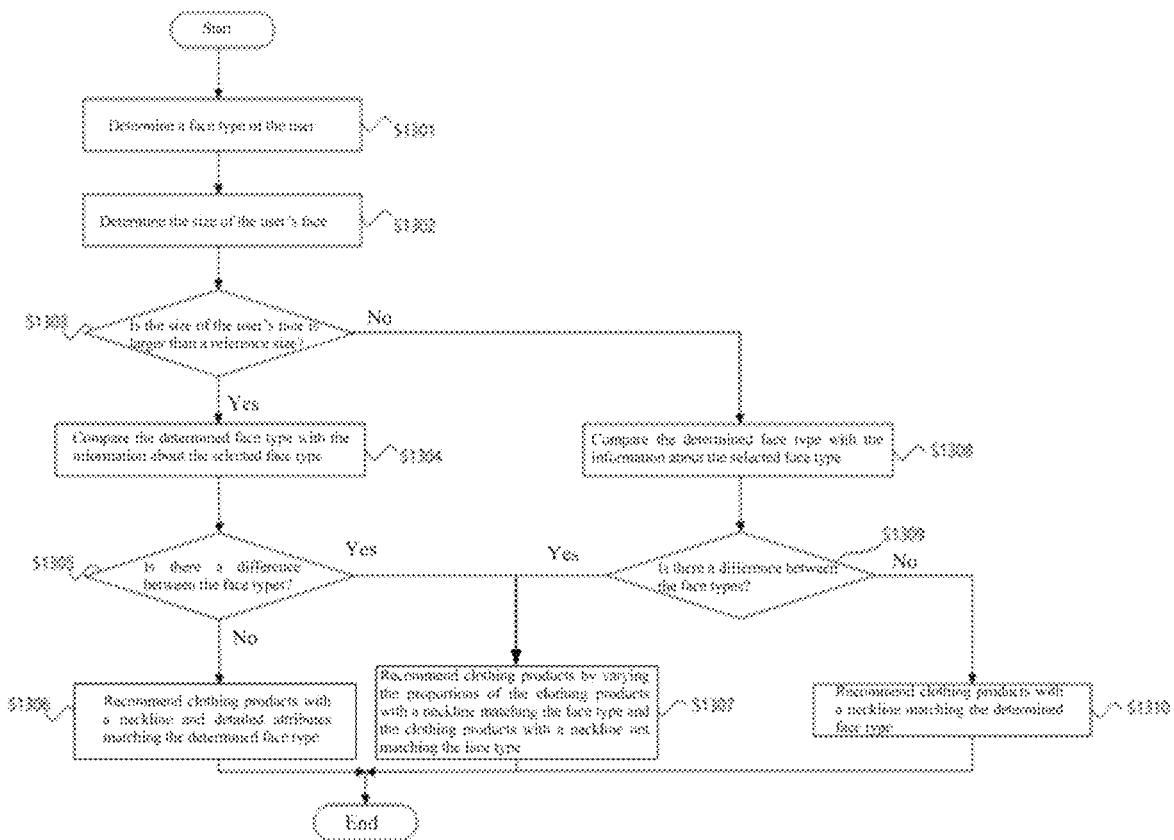
FIG. 14 illustrates a method for determining a face type of a user and recommending a clothing product according to another embodiment of the present disclosure.

FIG. 14 illustrates a method for determining a face type of a user and recommending a clothing product according to an embodiment of the present disclosure, for example, the operations of S1240, S1250 of FIG. 13.

Referring to FIG. 14, the method for determining the face type of the user and recommending the clothing product may include an operation S1301 that the neckline recommendation service providing server determines a face type of a user. The operation of determining the face type of the user may follow an operation for determining a face size of a user described above.

Also, the method for determining the face type of the user and recommending the clothing product may include operations S1302, S1303 that the neckline recommendation service providing server determines a face size of the user. The operation of determining the face size of the user may follow an operation for determining whether a user's face is a large-size face described above.

Additionally, the method for determining the face type of the user and recommending the clothing product may include operations S1304, S1305 that the neckline recommendation service providing server compares a determined face type with information about a selected face type if the user's face size is larger than a reference or predetermined face size. For example, when a determined face type is a round type but information about a selected face type is a square type, the neckline recommendation service providing server may determine that there exists a difference in the determined and selected face types. As another example, if a determined face type is a triangle type and information about a selected face type is a triangle type, the neckline recommendation service providing server may determine that there exists no difference in the determined and selected face types.

Further, the method for determining the face type of the user and recommending the clothing product may include an operation S1306 that the neckline recommendation service providing server searches and recommends one or more clothing products with a neckline and detailed attributes matching the determined face type if the user's face size is larger than a reference or predetermined face size and there is no difference between the determined face type and the selected face type. The operation of recommending the clothing products with the neckline matching the determined face type may follow an operation for recommending clothing products related to neckline type, width and depth of the neckline, and collar type described above.

Also, the method for determining the face type of the user and recommending the clothing product may include an operation that the neckline recommendation service providing server recommends one or more clothing products by adjusting or varying the proportions between clothing products with a neckline matching the face type determined by the neckline recommendation service providing server and clothing products not matching the determined face type if the user's face size is larger than a reference or predetermined face size and the determined face type differs from the selected face type. For example, if the determined face type differs from the selected face type, the neckline recommendation service providing server may recommend one or more clothing products by apportioning between clothing products with a neckline matching the determined face type and clothing products with an arbitrary neckline not matching the determined face type to form 70% and 30% of the entire clothing products, respectively.

Additionally, the method for determining the face type of the user and recommending the clothing product may include operations S1308, S1309 that the neckline recommendation service providing server compares the determined face type with the selected face type if the user's face size is not larger than a reference or predetermined face size. For example, if a determined face type is a round type and information about a selected face type is a square type, the neckline recommendation service providing server may determine that there exists a difference in the determined and selected face types. As another example, if a determined face type is a triangle type and information about a selected face type is a triangle type, the neckline recommendation service providing server may determine that there exists no difference in the determined and selected face types.

Further, the method for determining the face type of the user and recommending the clothing product may include an operation S1307 that the neckline recommendation service providing server recommends one or more clothing products by adjusting or varying the proportions between clothing products with a neckline matching the face type determined by the neckline recommendation service providing server and clothing products not matching the determined face type if the user's face size is not larger than a reference or predetermined face size and the determined face type differs from the selected face type. For example, if the determined face type differs from the selected face type, the neckline recommendation service providing server may recommend clothing products by apportioning between clothing products with a neckline matching the determined face type and clothing products with an arbitrary neckline not matching the determined face type to form 70% and 30% of the entire clothing products, respectively.

Additionally, the method for determining the face type of the user and recommending the clothing product may include an operation S1310 that the neckline recommendation service providing server recommends one or more clothing products with a neckline matching the determined face type if the user's face size is not larger than a reference or predetermined face size and there is no difference between the determined face type and the selected face type. The operation of recommending the clothing products with the neckline matching the determined face type may follow an operation for recommending clothing products related to neckline type described above.

Therefore, some exemplary embodiments of the present disclosure may recommend clothing products capable of supplementing a user's complex about the face. Also, certain exemplary embodiments of the present disclosure may recommend clothing products having a neckline suitable for a user's face type. Also, various exemplary embodiments of the present disclosure may recommend clothing products of which detailed attributes such as width and depth of a neckline and a collar arranged along the neckline are suitable for a user's face type.

Figure 15:
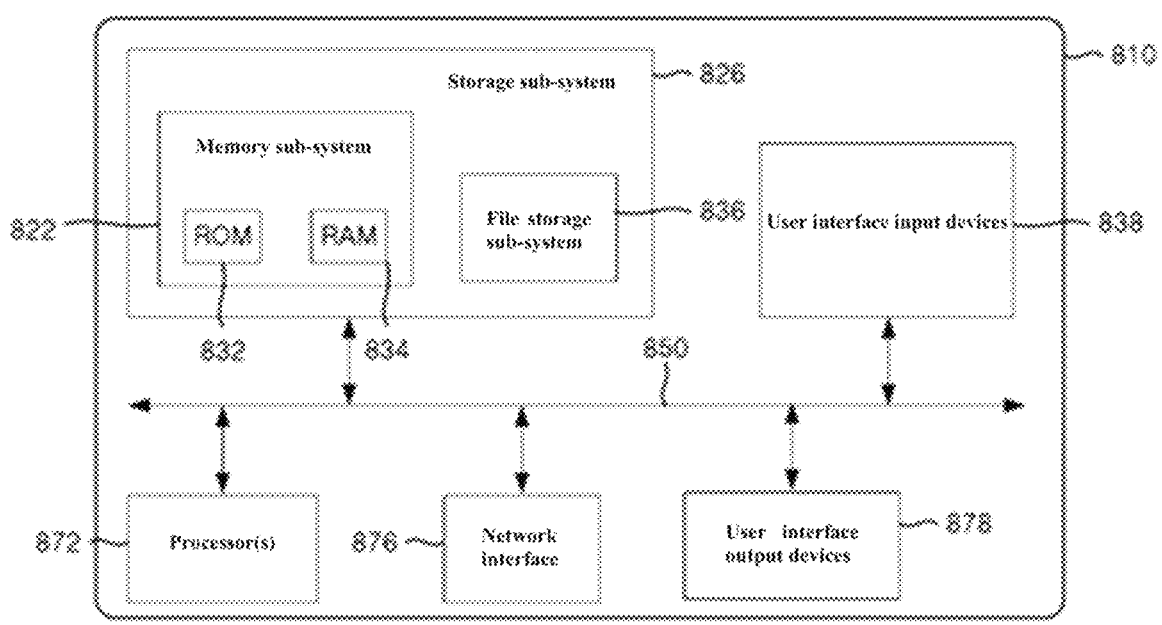
FIG. 15 illustrates a block diagram of a computer system implementing a method for providing a customized clothing recommendation service according to an embodiment of the present disclosure.

FIG. 15 illustrates a block diagram of a computer system implementing a method for providing a customized clothing recommendation service according to an embodiment of the present disclosure. The computer system may be an exemplary embodiment of a user terminal, a neckline recommendation service providing server, and a clothing product information providing server.

A processor 872 may be, for example, but not limited to, an ASIC or a RISC processor. Or the processor 872 may be an FPGA or other logic array or a gate array. The processor 872 may include a Graphic Processing Unit (GPU) resource. A computer system 810 may typically include at least one processor 872 configured to communicate with a plurality of peripheral devices through a bus sub-system 850. These peripheral devices, for example, include a storage sub-system 826 including a memory device and a file storage sub-system, a user interface input device 838, a user interface output device 878, and a network interface 876. The input and output devices enable a user to interact with the computer system 810. The network interface 876 may be configured to provide an interface to an external network, the interface including an interface to a corresponding interface device of another computer system.

For example, the user interface input devices 838 may include a keyboard; a pointing device such as a mouse, a trackball, a touch pad, or a graphic tablet; a scanner, a touch screen integrated in the display, a voice recognition system, an audio input device such as a microphone, and an input device of another type. In general, the use of a term "input device" should be understood to include all possible types of devices and a method for entering information to the computer system 810.

The user interface output devices 878 may include, for instance, but not limited to, a display sub-system, a printer, a fax device, or a non-visual display such as an audio output device. The display sub-system may include a flat panel device, such as Cathode Ray Tube (CRT) and Liquid Crystal Display (LCD), a projection device, or any other mechanism for generating a visual image. The display sub-system may also provide a non-visual display such as an audio output device. In general, the use of a term "output device" should be understood to include a method for outputting information from all possible types of devices and the computer system 810 to a user or other machine or other computer system.

The storage sub-system 826 may be configured to store programs and data structures providing the whole or part of functions of the modules and methods described in the present disclosure. Theses software modules are generally executed by the processor 826 alone or together with another processor.

For instance, the memory sub-system 822 used in the storage sub-system 826 may include a plurality of memories including the primary Random Access Memory (RAM) 834 for storing commands and data during execution of a program and Read Only Memory (ROM) 832 for storing fixed commands. The file storage sub-system 836 may provide a permanent storage device for program and data files and may include a hard disk drive, a floppy disk drive, a CD-ROM drive, an optical drive, or a removable medium cartridge together with a related removable medium. Modules which implement functions of specific implementation may be stored by the file storage sub-system 336 of the storage sub-system 826.

The bus sub-system 850 may be configured to provide a mechanism which enables various components and sub-systems of the computer system 810 to communicate with each other as intended. The bus sub-system 850 is briefly indicated as being made of a single bus, but other implementation examples of the bus sub-system may use a plurality of buses.

The computer system 810 may have various forms including a workstation, a server, a computing cluster, a blade server, a server farm, other arbitrary data processing system, or a computing device. Due to the ever-changing nature of computers and networks, descriptions of the illustrated computer system 810 should be understood as only an example. Many different structures of the computer system 810 may have a more or fewer number of constituting elements than the illustrated computer system.

The embodiments of the present disclosure may be implemented in the form of program commands which may be executed through various constituting elements of computer means and recorded in a computer-readable recording medium. The computer-readable recording medium may include program commands, data files, and data structures separately or in combination thereof. The program commands recorded in the computer-readable recording medium may be those designed and configured specifically for the present disclosure or may be those commonly available for those skilled in the field of computer software. Examples of a computer-readable recoding medium may include magnetic media such as hard-disks, floppy disks, and magnetic tapes; optical media such as CD-ROMs and DVDs; magneto-optical media such as floptical disks, and hardware devices specially designed to store and execute program commands such as ROM, RAM, and flash memory. Examples of program commands include not only machine codes such as those generated by a compiler but also high-level language codes which may be executed by a computer through an interpreter and the like. The hardware device may be configured to be operated by one or more software modules to perform the operations of the present disclosure, and vice versa.

Specific implementation of the present disclosure are embodiments, which does not limit the technical scope of the present disclosure in any other way. For the clarity of the disclosure, descriptions of conventional electronic structures, control systems, software, and other functional aspects of the systems may be omitted. Also, connection of lines between constituting elements shown in the figure or connecting members illustrate functional connections and/or physical or circuit connections, which may be replaceable in an actual device or represented by additional, various functional, physical, or circuit connection. Also, if not explicitly stated otherwise, "essential" or "important" elements may not necessarily refer to constituting elements needed for application of the present disclosure.

Also, although detailed descriptions of the present disclosure have been given with reference to preferred embodiments of the present disclosure, it should be understood by those skilled in the corresponding technical field or by those having common knowledge in the corresponding technical field that the present disclosure may be modified and changed in various ways without departing from the technical principles and scope specified in the appended claims. Therefore, the technical scope of the present disclosure is not limited to the content provided in the detailed descriptions of this document but has to be defined by the appended claims.

Various exemplary embodiments of the present disclosure may recommend clothing products capable of supplementing a user's complex about the face.

Also, certain exemplary embodiments of the present disclosure may recommend clothing products having a neckline suitable for a user's face type.

Further, some exemplary embodiments of the present disclosure may recommend clothing products of which detailed attributes such as width and depth of a neckline and a collar arranged along the neckline are suitable for a user's face type.

Accordingly, various exemplary embodiments of the present disclosure may provide a customized clothing recommendation service recommending clothing products with a neckline suitable for a user with faster processing time and speed and smaller processing resources requirements.

What is claimed is:

1. A method for providing a customized clothing recommendation service by a neckline recommendation service providing server connected with a user terminal, the method comprising:
    constructing a database storing clothing product information matching neckline types to clothing products;
    receiving, from the user terminal, an image including an upper body of a user;
    detecting a face from the received image of the user, and determining a face type of the detected face;
    selecting one or more neckline types for the customized clothing recommendation service based on the determined face type of the received image of the user among the neckline types stored in the database;
    searching the database storing the clothing product information matching the neckline types to the clothing products for the selected one or more neckline types to find one or more clothing products matching the selected one or more neckline types; and
    providing a search result including the found one or more clothing products with the selected one or more neckline types suitable for the user to the user terminal,
    wherein the database stores a plurality of face types including a round type, an oblong type, a square type, an oval type, and a triangle type.

2. The method of claim 1, wherein the image including the upper body of the user comprises a whole face and both ends of shoulders of the user; and
    the upper body image includes an image stored in the user terminal or an image captured by an image capturing device.

3. The method of claim 1, further comprising:
    deriving, from the received image of the user, a first value corresponding to a head width, a second value corresponding to a vertical head length, a third value for determining a length of a jawline, and a fourth value corresponding to a length of a forehead from the received image of the user; and
    determining the face type of the user as at least one of the round type, the oblong type, the square type, the oval type, and the triangle type based on the derived first to fourth values.

4. The method of claim 1, wherein the database stores the neckline types of the clothing products including a V-shaped type, a square type, a boat type, a round type, a sweetheart type, an off-shoulder type, and a U-shaped type.

5. The method of claim 4, the searching of the database storing the clothing product information matching the neckline types to the clothing products for the selected one or more neckline types comprises finding one or more clothing products matched with the round type or off-shoulder type neckline among the clothing products stored in the database when the determined face type is the oblong type.

6. The method of claim 4, wherein the searching of the database storing the clothing product information matching the neckline types to the clothing products for the selected one or more neckline types comprises finding one or more clothing products matched with the V-shaped type, the square type or the boat type neckline among the clothing products stored in the database when the determined face type is the round type.

7. The method of claim 4, wherein the searching of the database storing the clothing product information matching the neckline types to the clothing products for the selected one or more neckline types comprises finding one or more clothing products matched with the round type, the U-shaped type, or the sweetheart type neckline among the clothing products stored in the database when the determined face type is the square type.

8. The method of claim 4, wherein the searching of the database storing the clothing product information matching the neckline types to the clothing products for the selected one or more neckline types comprises finding one or more clothing products matched with the V-shaped type, the square type, the boat type, the round type, the sweetheart type, the off-shoulder type or the U-shaped type neckline among the clothing products stored in the database when the determined face type is the oval type.

9. The method of claim 4, wherein the searching of the database storing the clothing product information matching the neckline types to the clothing products for the selected one or more neckline types comprises finding one or more clothing products matched with the round type, the U-shaped type, or the boat type neckline among the clothing products stored in the database when the determined face type is the triangle type.

10. The method of claim 1, wherein the clothing product information includes collar information of each of the clothing products, and
    wherein the searching of the database storing the clothing product information matching the neckline types to the clothing products for the selected one or more neckline types comprises:
    finding one or more clothing products with a neckline having a collar of which vertical length is longer than a predetermined length among the clothing products stored in the database when the determined face type is the round type; and
    finding one or more clothing products with a neckline having a collar of which vertical length is shorter than the predetermined length among the clothing products stored in the database when the determined face type is the oblong type.

11. The method of claim 3, wherein the determining of the face type of the detected face includes measuring a fifth value corresponding to a shoulder width and determining whether a size of the detected face is larger than a predetermined reference face size based on the first to fifth values.

12. The method of claim 11, wherein the clothing product information further includes neckline width and depth information of each of the clothing products,
    wherein the searching of the database storing the clothing product information matching the neckline types to the clothing products for the selected one or more neckline types comprises:
    finding one or more clothing products with a neckline of which depth is greater than a predetermined standard neckline depth, one or more clothing products with a neckline of which width is greater than a predetermined standard neckline width, or one or more clothing products with a neckline of which depth and width are greater than the predetermined standard neckline depth and width, among the clothing products stored in the database, when the size of the detected face is larger than the predetermined reference face size.

13. The method of claim 11, wherein the searching of the database storing the clothing product information matching the neckline types to the clothing products for the selected one or more neckline types comprises:
   if the size of the detected face is larger than the predetermined reference face size, finding one or more clothing products with a neckline and detailed attributes matching the size of the detected face and the determined face type; and
   if the size of the detected face is smaller than the predetermined reference face size, finding one or more clothing products with a neckline matching the size of the detected face and the determined face type.

14. A method for providing a customized clothing recommendation service by a neckline recommendation service providing server connected with a user terminal, the method comprising:
   receiving information about clothing products including information about neckline types of the clothing products;
   receiving, from the user terminal, an image including an upper body of a user including a face;
   receiving, from the user terminal, selection of a face type input by the user;
   detecting a face from the received image including the upper body and determining a face type of the detected face; and
   selecting one or more clothing products based on the face type determined by the neckline recommendation service providing server and the received selection of the face type input by the user, and providing a search result including the one or more clothing products selected based on the face type to the user terminal,
   wherein the detecting of the face from the received image including the upper body and the determining of the face type of the detected face include:
   detecting a first value corresponding to a head width, a second value corresponding to a vertical head length, a third value for determining a length of a jawline, and a fourth value corresponding to a length of a forehead from the received image including the upper body; and
   determining the face type of the detected face of the user based on the first to fourth values.

15. The method of claim 14, wherein the selecting of the one or more clothing products based on the face type determined by the neckline recommendation service providing server and the received selection of the face type input by the user includes:
   finding one or more first clothing products with a first neckline matching the face type determined by the neckline recommendation service providing server;
   finding one or more second clothing products with a second neckline matching the received selection of the face type input by the user; and
   selecting third clothing products from the one or more first clothing products with the first neckline and the one or more second clothing products with the second neckline, and providing the search result including the selected third clothing products as clothing products with a recommended neckline.

16. The method of claim 14, wherein the detecting of the face from the received image including the upper body and the determining of a face type of the detected face include:
   deriving a first value corresponding to a head width, a second value corresponding to a vertical head length, a third value for determining a length of a jawline, and a fourth value corresponding to a length of a forehead from the detected face, and determining the face type of the detected face based on the first to fourth values; and
   deriving a fifth value corresponding to a shoulder width from the received image and determining whether the detected face is larger than a predetermined reference face based on the first to fifth values.

17. The method of claim 16, wherein the selecting of the one or more clothing products based on the face type determined by the neckline recommendation service providing server and the received selection of the face type input by the user comprises searching one or more clothing products with a neckline and detailed attributes matching the face type determined by the neckline recommendation service providing server if the detected face is larger than the predetermined reference face and the face type determined by the neckline recommendation service providing server is identical to the received selection of the face type input by the user.

18. A system providing a customized clothing recommendation service by a neckline recommendation service providing server connected with a user terminal, the system comprising:
   at least one processor; and
   at least one memory, wherein
   at least one program is stored in the at least one memory and is executed by the at least one processor, the at least one program configured to:
   construct a database storing clothing product information matching neckline types to clothing products;
   receive an image including an upper body of a user;
   detect a face from the received image of the user, and determine a face type of the detected face;
   select one or more neckline types for the customized clothing recommendation service based on the determined face type of the received image of the user among the neckline types stored in the database;
   search the database storing the clothing product information matching the neckline types to the clothing produces for the selected one or more neckline types to find one or more clothing products matching the selected one or more neckline types, and
   provide a search result including the found one or more clothing products with the selected one or more neckline types suitable for the user to the user terminal,
   wherein the detecting of the face from the received image including the upper body and the determining of the face type of the detected face include:
   detecting a first value corresponding to a head width, a second value corresponding to a vertical head length, a third value for determining a length of a jawline, and a fourth value corresponding to a length of a forehead from the received image including the upper body; and
   determining the face type of the detected face of the user based on the first to fourth values.

* * * * *